United States Patent
Yang et al.

(10) Patent No.: US 11,610,067 B2
(45) Date of Patent: Mar. 21, 2023

(54) MACHINE READING COMPREHENSION METHOD, MACHINE READING COMPREHENSION DEVICE AND NON-TRANSIENT COMPUTER READABLE MEDIUM FOR BUILDING A MEMORY FEATURE FUSION NEURAL NETWORK WITH MULTIPLE ROUNDS OF DIALOGUE MEMORY FEATURE

(71) Applicant: INSTITUTE FOR INFORMATION INDUSTRY, Taipei (TW)

(72) Inventors: Wei-Jen Yang, Taipei (TW); Yu-Shian Chiu, Taipei (TW); Guann-Long Chiou, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 246 days.

(21) Appl. No.: 16/952,051

(22) Filed: Nov. 18, 2020

(65) Prior Publication Data
US 2022/0121825 A1    Apr. 21, 2022

(30) Foreign Application Priority Data
Oct. 19, 2020    (TW) .................................. 109136179

(51) Int. Cl.
G06F 40/35 (2020.01)
G06N 3/04 (2023.01)
G06F 40/205 (2020.01)

(52) U.S. Cl.
CPC .......... *G06F 40/35* (2020.01); *G06N 3/0427* (2013.01); *G06F 40/205* (2020.01)

(58) Field of Classification Search
CPC ..... G06F 40/35; G06F 40/205; G06N 3/0427; G06N 3/0454
See application file for complete search history.

(56) References Cited

U.S. PATENT DOCUMENTS

| | | | |
|---|---|---|---|
| 2019/0156210 A1* | 5/2019 | He | G06F 16/903 |
| 2019/0237068 A1* | 8/2019 | Canim | G10L 15/22 |
| 2020/0380991 A1* | 12/2020 | Ge | G10L 15/22 |
| 2021/0005195 A1* | 1/2021 | Tao | G06F 3/167 |
| 2021/0366016 A1* | 11/2021 | Hiranandani | G06N 20/00 |
| 2022/0067278 A1* | 3/2022 | Huang | G06F 40/30 |

FOREIGN PATENT DOCUMENTS

CN    111259668 A    6/2020

OTHER PUBLICATIONS

The office action of the corresponding Taiwanese application No. TW109136179 dated Jun. 4, 2021.

* cited by examiner

*Primary Examiner* — Michael N Opsasnick
(74) *Attorney, Agent, or Firm* — CKC & Partners Co., LLC

(57) ABSTRACT

A machine reading comprehension method includes the following operations: performing a relation augment self attention (RASA) feature extraction process on at least one historical dialogue data and a current question data respectively to obtain at least one historical dialogue feature and a current question feature; and performing a machine reading comprehension (MRC) analysis according to the at least one historical dialogue feature and the current question feature to obtain a response output.

17 Claims, 10 Drawing Sheets

RRA

MACHINE READING COMPREHENSION METHOD, MACHINE READING COMPREHENSION DEVICE AND NON-TRANSIENT COMPUTER READABLE MEDIUM FOR BUILDING A MEMORY FEATURE FUSION NEURAL NETWORK WITH MULTIPLE ROUNDS OF DIALOGUE MEMORY FEATURE

CROSS-REFERENCE TO RELATED APPLICATION

This application claims the priority benefit of TAIWAN Application serial no. 109136179, filed Oct. 19, 2020, the full disclosure of which is incorporated herein by reference.

BACKGROUND

Field of Invention

The invention relates to a machine reading comprehension method, a machine reading comprehension device and a non-transient computer readable medium. More particularly, the invention relates to a machine reading comprehension method, a machine reading comprehension device and a non-transient computer readable medium of building the memory feature fusion neural network with multiple rounds of dialogue memory feature.

Description of Related Art

The demand for conversational artificial intelligence in enterprises has increased dramatically. The traditional method is a single-sentence question-and-answer method, with one-question-one-answer single-sentence search-style Q&A comprehension, and contextual understanding is not possible. If the question is not the question with the habit of human dialogue, that is, if the dialogue is not complete, it is prone to misjudgment. If multiple rounds of dialogue search question and answer are gone through, the integration of historical dialogue records can effectively correct the situation where a single sentence cannot be understood, and the experience of dialogue artificial intelligence may be enhanced.

In addition, the sentence structure of the natural language is complex, and a sentence may include a lot of information. If one sentence can be expanded into several simple structures, the accuracy of machine reading comprehension can be effectively improved.

SUMMARY

An aspect of this disclosure is to provide a machine reading comprehension method is disclosed. The machine reading comprehension method includes the following operations: performing, by a processor, a relation augment self attention (RASA) feature extraction process on at least one historical dialogue data and a current question data respectively to obtain at least one historical dialogue feature and a current question feature; and performing, by the processor, a machine reading comprehension (MRC) analysis according to the at least one historical dialogue feature and the current question feature to obtain a response output.

Another aspect of this disclosure is to provide a machine reading comprehension device. The machine reading comprehension device includes a memory and a processor. The memory is configured to store at least one historical dialogue data. The processor is coupled to the memory and is configured to perform a RASA feature extraction process on the at least one historical dialogue data and a current question data respectively to obtain at least one historical dialogue feature and a current question feature, and configured to perform a MRC analysis according to the at least one historical dialogue feature and the current question feature to obtain a response output.

Another aspect of this disclosure is to provide a non-transient computer readable medium, comprising at least one program command configured to operate a machine reading comprehension method, wherein the machine reading comprehension method comprises following operations: performing, by a processor, a RASA feature extraction process on at least one historical dialogue data and a current question data respectively to obtain at least one historical dialogue feature and a current question feature; and performing, by the processor, a MRC analysis according to the at least one historical dialogue feature and the current question feature to obtain a response output.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
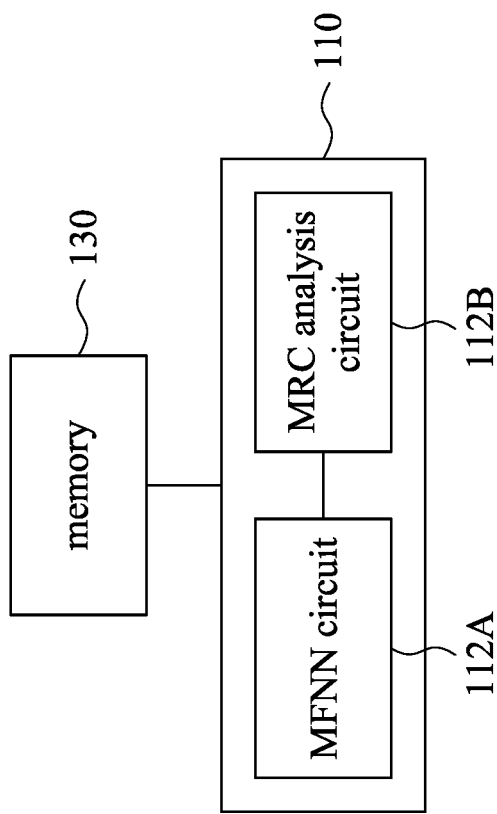
FIG. 1 is a schematic diagram illustrating a machine reading comprehension device according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating a machine reading comprehension device 100 according to some embodiments of the present disclosure. As illustrated in FIG. 1, a machine reading comprehension device 100 includes a processor 110 and a memory 130. The processor 110 is coupled to the memory 130. The processor 110 includes a Memory Fusion Neural Network (MFNN) circuit 112A and a machine reading comprehension analysis circuit 112B.

In some embodiments, the memory 130 is configured to store historical dialogue data. The historical dialogue data includes historical question data and historical response data.

Figure 2:
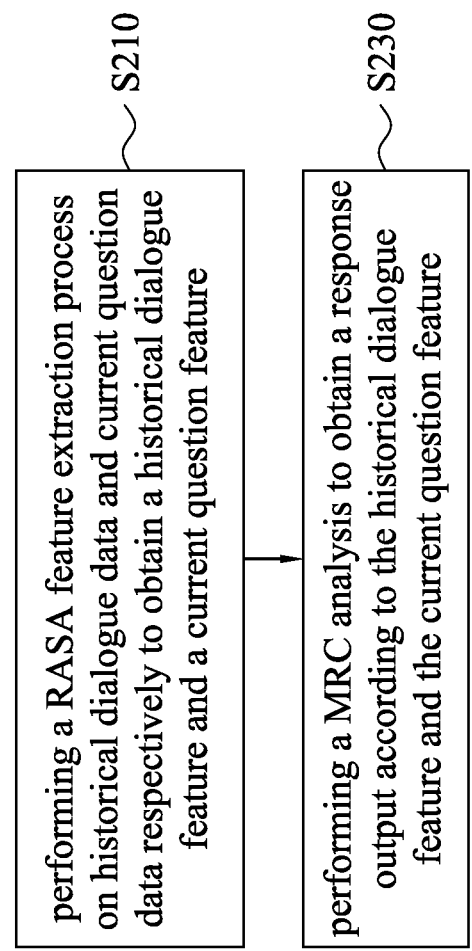
FIG. 2 is a flowchart of a machine reading comprehension method according to some embodiments of the present disclosure.

Reference is made to FIG. 2. FIG. 2 is a flowchart of a machine reading comprehension method 200 according to some embodiments of the present disclosure. The embodiments of the present disclosure are not limited thereto.

It should be noted that the machine reading comprehension method 200 can be applied to a machine reading comprehension device 100 that is the same as or similar to the structure as shown in FIG. 1. To simplify the description below, the embodiments shown in FIG. 1 will be used as an example to describe the method according to an embodiment of the present disclosure. However, the present disclosure is not limited to application to the embodiments shown in FIG. 1.

It should be noted that, in some embodiments, the method may be implemented as a computer program. When the computer program is executed by a computer, an electronic device, or the one or more processor of the machine reading comprehension device 100, this executing device perform the reading comprehension method 200. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

Furthermore, is should be noted that, the operations of the operation method mentioned in the present embodiment can be adjusted according to actual needs except for those whose sequences are specifically stated, and can even be executed simultaneously or partially simultaneously.

Furthermore, in different embodiments, these operations may also be adaptively added, replaced, and/or omitted.

Reference is made to FIG. 2. The machine reading comprehension method 200 includes the following operations.

In operation S210: a RASA feature extraction process is performed on historical dialogue data and current question data respectively to obtain a historical dialogue feature and a current question feature.

Reference is made to FIG. 1 again, in some embodiments, the operation S210 may be operated by the MFNN circuit 112A as illustrated in FIG. 1. The details of the operation S210 is illustrated in the following with reference to FIG. 3 together.

Figure 3:
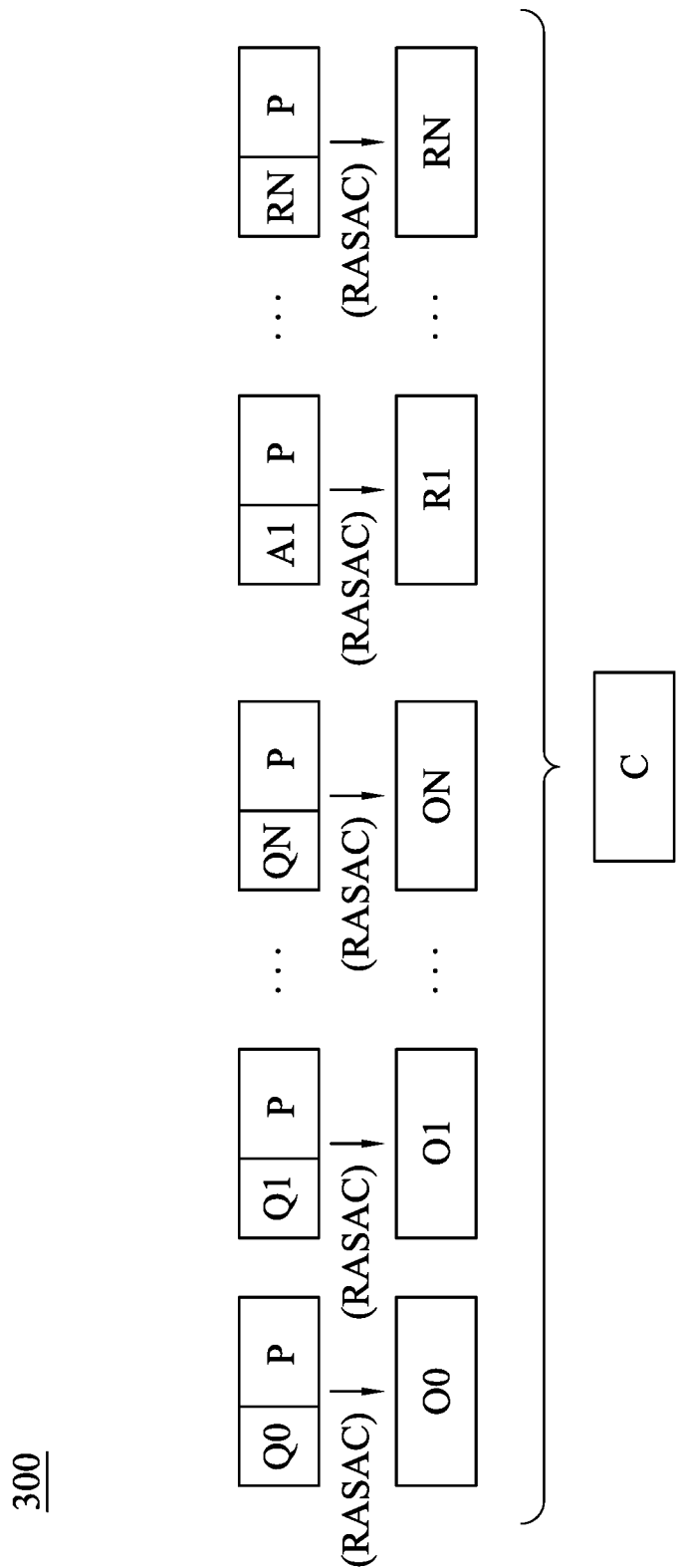
FIG. 3 is a schematic diagram illustrating an operation of a memory fusion neural network according to some embodiments of the present disclosure.

Reference is made to FIG. 3. FIG. 3 is a schematic diagram illustrating an operation of a memory fusion neural network (MFNN) process 300 according to some embodiments of the present disclosure. The MFNN process 300 includes several RASA feature extraction processes RASAC.

As illustrated in FIG. 3, Q0 is current question data, Q1 to QN and A1 to AN are historical dialogue data. Q1 to QN are historical question data, A1 to AN are historical response data. The processor 110 generates the current question feature according to the current question data, and generates the historical dialogue feature according to the historical dialogue data.

In details, current question feature O0 is generated according to the current question data Q0 through the RASA feature extraction process RASAC. The historical question features O1 to ON are generated according to the historical question data Q1 to QN through the RASA feature extraction process RASAC. The historical response features R1 to RN are generated according to the historical response data A1 to AN through the RASA feature extraction process RASAC. The processor 110 further concatenates the historical dialogue feature, in which the historical dialogue feature includes the historical question feature and the historical response feature, with the current question feature, to generate the concatenated feature C.

In some embodiments, when generating the current question feature O0, the historical question feature O1 to ON, and the historical response feature R1 to RN, the processor 110 further operates RASA feature extraction process RASAC on each of the current question data Q0, the historical question data Q1 to QN, and the historical response data A1 to AN with the text data P together so as to generate the current question feature O0, the historical question features O1 to ON, and the historical response features A1 to AN.

Figure 4:
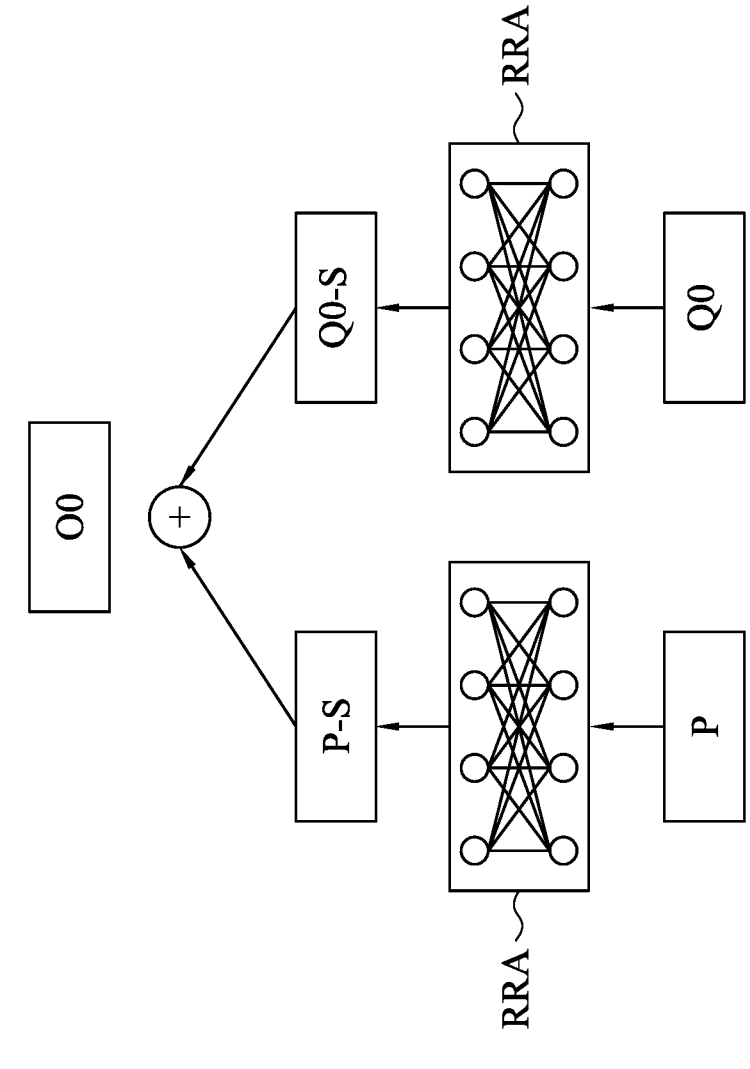
FIG. 4 is a schematic diagram illustrating a RASA feature extraction process according to some embodiments of the present disclosure.

Reference is made to FIG. 4. FIG. 4 is a schematic diagram illustrating a RASA feature extraction process RASAC according to some embodiments of the present disclosure. Herein generating the current question feature O0 according to the current question data Q0 is taken as an example for illustration.

As illustrated in FIG. 4, after the processor 110 performs RASA analysis RRA on the text feature P, the text feature P-S is generated. After the processor 110 performs RASA analysis RRA on the current question data Q0, the current question sub feature Q0-S is generated. And then, the processor 110 concatenates the text feature P-S and the current question sub feature Q0-S, so as to generate the current question feature O0.

So on and so forth, after the processor 110 performs the RASA analysis RRA on the historical question data Q1, the historical question sub feature Q1-S is generated (not shown). And then, the processor 110 concatenates the text feature P-S and the historical question sub feature Q1-S, so as to generate the historical question feature O1, and so on.

Similarly, after the processor 110 performs the RASA analysis RRA on the historical response data A1, the historical response sub feature A1-S is generated (not shown). And then, the processor 110 concatenates the text feature P-S and the historical response sub feature A1-S, so as to generate the historical response feature R1, and so on.

In some embodiments, the processor 110 further adjusts the feature lengths of the current question feature O0, the historical response features O1 to ON and the historical response features R1 to RN.

Figure 7:
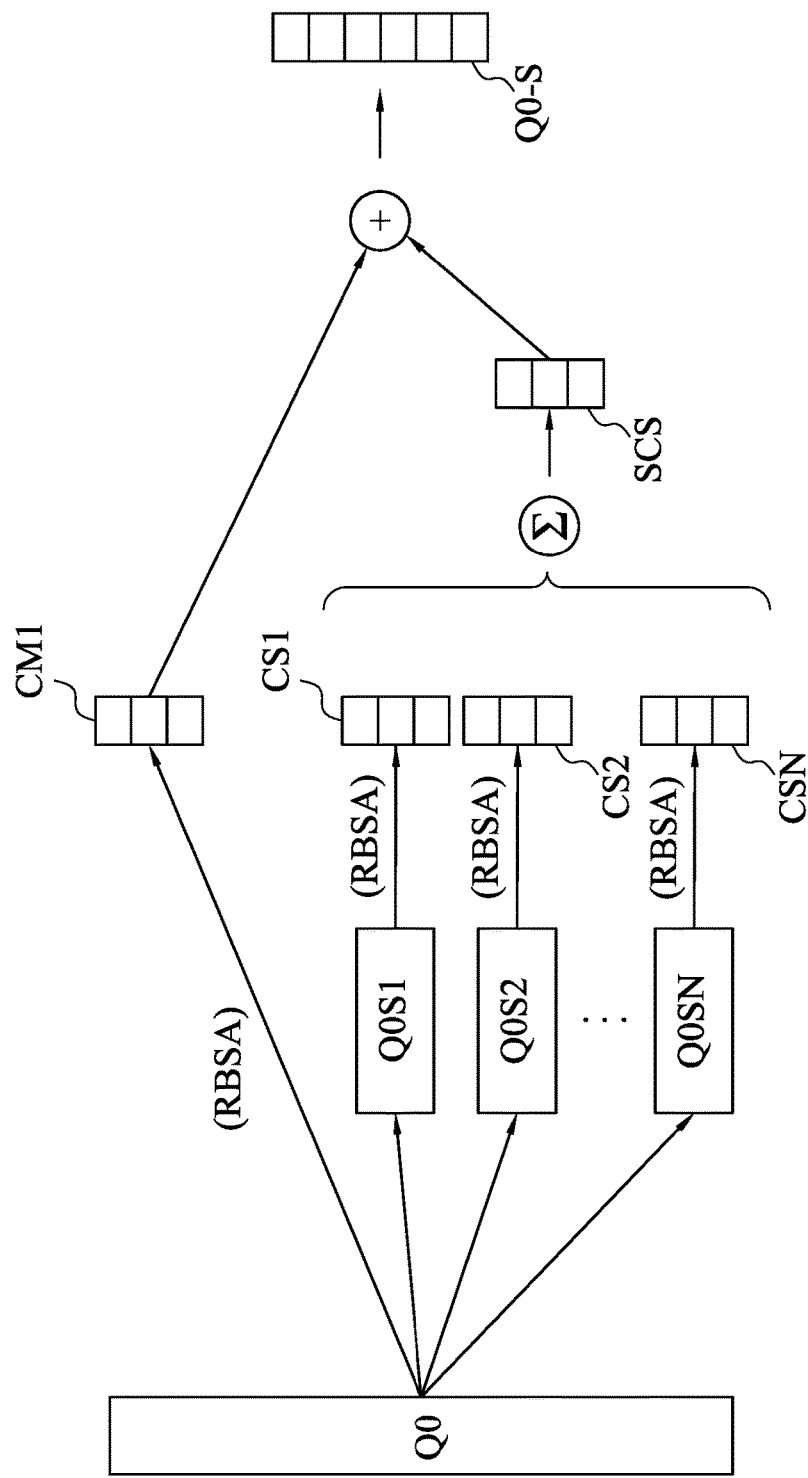
FIG. 7 is a schematic diagram illustrating a RASA analysis according to some embodiments of the present disclosure.
Figure 8:
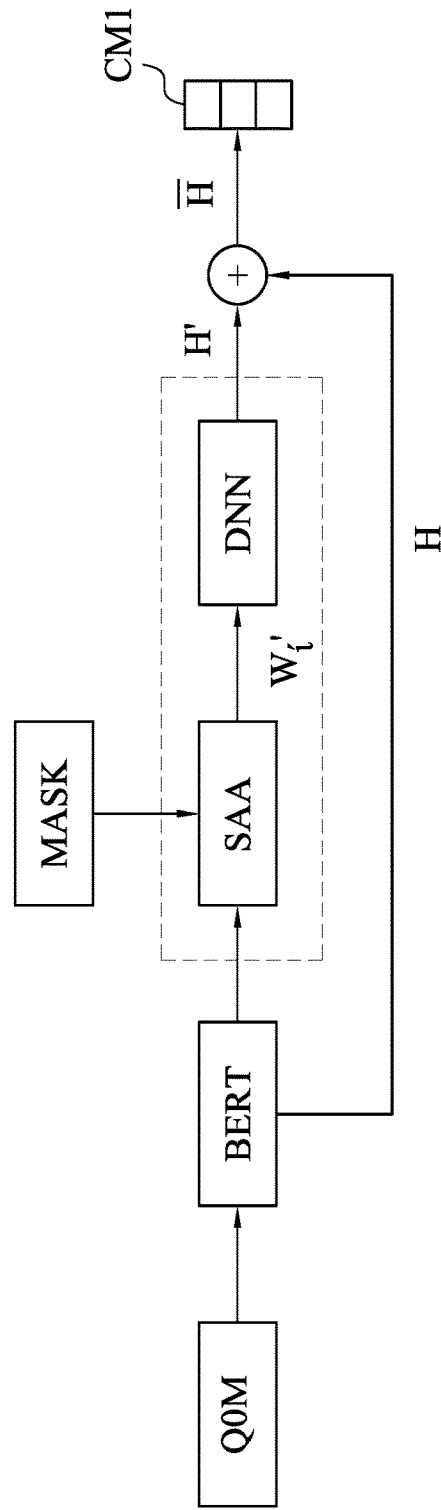
FIG. 8 is a schematic diagram illustrating a RBSA process according to some embodiments of the present disclosure.

For the detailed description of RASA analysis RRA, reference is made to FIG. 7 to FIG. 8 together.

When the processor 110 performs the RASA analysis RRA, first of all, the processor 110 disassembles each of the historical question data, the historical response data and the current question data into the sub historical question data, the sub historical response data and the sub current question data.

In details, when the processor 110 disassembles a sentence, the processor 110 disassembles each of the historical question data, the historical response data and the current question data into several phrases, and the processor 110 analyzes several part-of-speeches of the several phrases. According to the several phrases and the several part-of-speeches, the processor 110 composes several sub historical question data, several sub historical response data and several sub current question data.

The method of disassembling the historical response data into several sub historical response data is the same as or similar to the method of disassembling the historical question data into several sub historical question data. The detailed illustration may not be illustrated herein.

In some embodiments, the processor 110 further generates several relation masks (Mask) according to the phrases and the part-of-speeches mentioning above. Each of the relation masks includes several relation points, in which the relation points are configured to mark the master-slave relationships between the phrases.

The following will take English as an example for explanation. The embodiments of the present disclosure are not limited thereto.

Figure 5A:
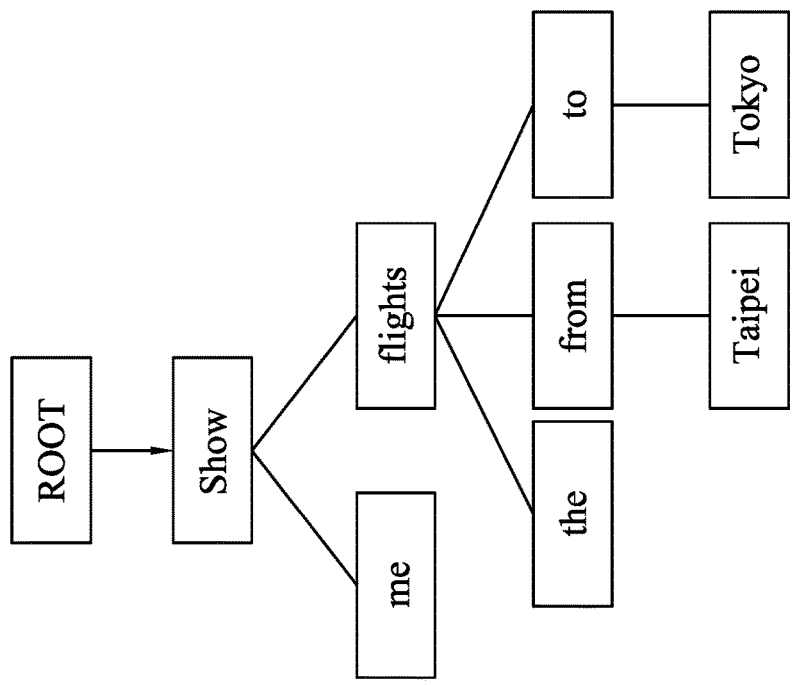
FIG. 5A is a schematic diagram illustrating a parse tree according to some embodiments of the present disclosure.

Reference is made to FIG. 5A. FIG. 5A is a schematic diagram illustrating a parse tree 700A according to some embodiments of the present disclosure. For example, assume that the current question data Q0 is "show me the flights from Taipei to Tokyo". After analysis, several phrases "show", "me", "the", "flights", "from", "Taipei", "to", "Tokyo" are obtained. In the phrases mentioning above, the part-of-speech corresponding to the phrase "show" is a verb, The part-of-speech corresponding to the phrase "me" is a pronoun, the part-of speech corresponding to the phrase "the" is an article, the part-of-speeches corresponding to the phrases "flights", "Taipei", "Tokyo" are nouns, and the part-of-speeches corresponding to the phrases "from", "to" are preposition. After the disassemble mentioning above, the processor 110 produces the phrase relationship chart as illustrated in the parse tree 700A. After disassembling out the phrase relationship chart, the processor 110 generates several sub current question data.

Figure 5B:
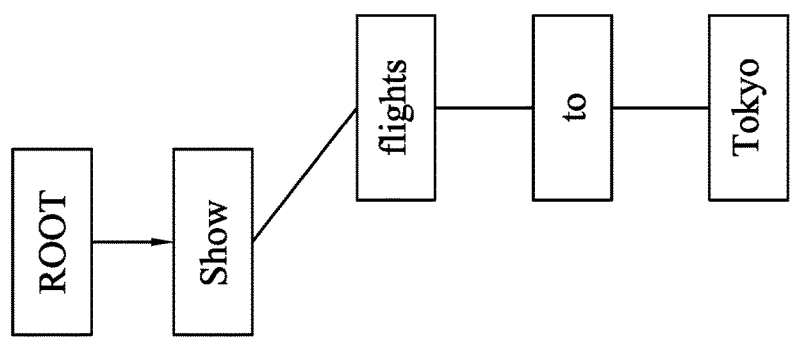
FIG. 5B is a schematic diagram illustrating a parse tree according to some embodiments of the present disclosure.

For example, reference is made to FIG. 5B together. FIG. 5B is a schematic diagram illustrating a parse tree 700B according to some embodiments of the present disclosure. The sub current question data corresponding to the parse tree 700B is "show flights to Tokyo". However, the sub current question data is not limited thereto. Other sub current question data includes "show flights from Taipei", "show flights", and so on.

Figure 6A:
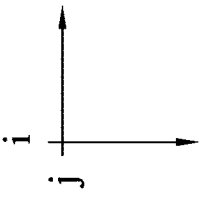
FIG. 6A is a schematic diagram illustrating a relation mask according to some embodiments of the present disclosure.
Figure 6B:
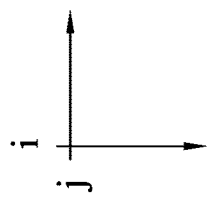
FIG. 6B is a schematic diagram illustrating a relation mask according to some embodiments of the present disclosure.

Reference is made to FIG. 6A and FIG. 6B again. FIG. 6A is a schematic diagram illustrating a relation mask M8A according to some embodiments of the present disclosure. FIG. 6B is a schematic diagram illustrating a relation mask M8B according to some embodiments of the present disclosure.

The relation mask M8A corresponds to the parse tree 700A in FIG. 5A, and the relation mask M8B corresponds to the parse tree 700B. The relation point $M(i,j)=1$ indicates that j is an ancestor node of i or that i=j. On the other hand, the relation point $M(i,j)=0$ indicates that j is not an ancestor node of i and that i≠j.

Reference is made to FIG. 7. FIG. 7 is a schematic diagram illustrating a RASA analysis RRA according to some embodiments of the present disclosure. In FIG. 7, the input as the current question data Q0 and the output as the current question sub feature Q0-S is taken for example for the following illustration. The current question data Q0 is disassembled into several sub current question data Q0S1 to Q0SN.

After each of the current question data Q0 and several sub current question data Q0S1 to Q0SN performs the RBSA (Relation-based Self Attention) process, the current question vector CM1 and the several sub current question vectors CS1 to CSN are generated. In details, after the current question data Q0 performs the RBSA process, the current question vector CM1 is generated according to the relation mask corresponding to the current question data Q0. After the sub current question data Q0S1 performs the RBSA process, the sub current question vector CS1 is generated according to the relation mask corresponding to the sub current question data Q0S1. After the sub current question data Q0S performs the RBSA process, the sub current question vector CS2 is generated according to the relation mask corresponding to the sub current question data Q0S2, and so on.

And then, the processor 110 adds several sub current question vectors CS1 to CSN so as to generate the total sub current question vector SCS. And then, after concatenating the total sub current question vector SCS and the current question vector CM1, a current question sub feature Q0-S is generated. In some embodiments, the processor 110 is further configured to adjust a feature length of the current question sub feature Q0-S.

Similarly, the historical question data may also be disassembled into several sub historical question data, and through the RBSA process, the historical question data and the several sub historical question data generate the historical question vector and several sub historical question vectors. The processor 110 adds several sub historical question vectors and concatenates the result with the historical question vector, so as to generate the historical question sub feature.

Similarly, the historical response data may also be disassembled into several sub historical response data, and after the RBSA process, the historical response data and the several sub historical response data generates the historical response vector and several sub historical response vectors. The processor 110 adds several sub historical response vectors and concatenates the result with the historical response vector, so as to generate the historical response sub feature.

Reference is made to FIG. 8. FIG. 8 is a schematic diagram illustrating a RBSA process according to some embodiments of the present disclosure. In FIG. 8, the current question data Q0 is taken as an example, the execution methods of other sub current question data, historical question data, sub historical question data, historical response data, sub historical response data, etc. can be deduced by analogy.

As illustrated in FIG. 8, after the processor 110 performs the BERT (Bidirectional Encoder Representations from Transformers) process according to the current question data Q0 to generate output H. After the processor 110 performs the BERT process according to the current question data Q0, the processor 110 performs the RBSA process to generate the output H'. The processor 110 further generates the output H according to the output H and the output H' so as to generate the historical question vector CM1. When performing the RBSA process, the processor 110 performs the RBSA process according to the relation mask MASK corresponding to the current question data Q0.

As illustrated in FIG. 8, in some embodiments, the RBSA process includes the self attention mechanism SAA and the deep neural network DNN. After performing the self attention mechanism SAA, the output $W_i'$ is generated, and the deep neural network DNN is performed according to the output $W_i'$, and the output H' is generated.

In details, in FIG. 8, the RBSA process includes the following formulas:

$$W_i' = \text{softmax}\left(\frac{\mathcal{M} \cdot (Q_i' K_i')}{\sqrt{d_k}}\right) V_i'.$$

$$H' = DNN(W_i').$$

$$\overline{H} = \alpha H + (1-\alpha) H'.$$

In the formulas mentioning above, $\mathcal{M}$ is the relation mask MASK, softmax is the conversion function of the self attention mechanism SAA. $Q_i'$ is query. $K_i'$ is key. $V_i'$ is value. $d_k$ is a dimension of K. α is a adjusting parameter. H' is an output through the deep neural network DNN. $W_i'$ is an output through the self attention mechanism SAA. H is an output through the BERT process. $\overline{H}$ is an output after calculating $\overline{H}$ and H according to the formulas mentioning above.

Reference is made to FIG. 2 again. In operation S230, a MRC analysis is performed to obtain a response output according to the historical dialogue feature and the current question feature. Reference is made to FIG. 1 together, in some embodiments, operation S230 is operated by the processor 110 and the MRC analysis circuit 112B in FIG. 1.

In the present disclosure, various MRC analysis methods can be used to generate CNN encoding. The following will take a MRC analysis method as an example for description. For example, In some embodiments, MRC analysis methods include the following operations: standardizing data, encoding convolutional neural network CNN, and generating response output.

In details, in some embodiments, after the processor 110 standardizes the concatenated feature C generated by operation S210, a CNN encoding is performed to generate a CNN encoding result, and then a response output is generated according to the data of the relevant language and the CNN encoding result.

In some embodiments, the processor 250 may be a server or other device. In some embodiments, the processor 250 may be a server, a circuit, a central processing unit (central processing unit, CPU), and a microprocessor (MCU) for storing, calculating, reading data, receiving signals or messages, and transmitting signals or messages, or other devices with equivalent functions. In some embodiments, the cameras 110 and 214 may be circuits with functions such as image capture and shooting, and other devices with equivalent functions. In some embodiments, the memory 130 may be an element with a storage function or a similar function.

According to the embodiment of the present disclosure, it is understood that the embodiment of the present disclosure is to provide a machine reading comprehension method, a machine reading comprehension device and a non-transient computer readable medium, by integrating historical dialogue records and important contextual information, search queries that support several rounds of dialogue is realized. It can effectively correct situations where a single sentence cannot be understood, which can effectively improve communication efficiency and enhance the dialogue experience. In addition, a sentence is integrated through the associated augmentation method. The words are expanded into simple content with multi-sentence structures. As a self attention mechanism feature, it can effectively improve the accuracy of machine reading comprehension. Based on the above, the embodiments of the present disclosure are a multi-round dialogue search based on the correlation augmented self-attention mechanism. With sentence amplification (associative amplification clause), new features (associative amplification from attention feature, multi-round dialogue memory feature) and new architecture (memory feature fusion neural network, Memory Fusion Neural Network (MFNN)) to reach high accuracy.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A machine reading comprehension method, comprising:
    performing, by a processor, a relation augment self attention (RASA) feature extraction process on at least one historical dialogue data and a current question data respectively to obtain at least one historical dialogue feature and a current question feature; and
    performing, by the processor, a machine reading comprehension (MRC) analysis according to the at least one historical dialogue feature and the current question feature to obtain a response output;

wherein the at least one historical dialogue data comprises at least one historical question data and at least one historical response data, and the at least one historical dialogue feature comprises at least one historical question feature and at least one historical response feature; and wherein performing the RASA feature extraction process on the at least one historical dialogue data and the current question data respectively comprises:

performing a RASA analysis on the at least one historical question data, the at least one historical response data and the current question data respectively to obtain at least one historical question sub feature, at least one historical response sub feature and a current question sub feature;

performing the RASA analysis on a text data to obtain a text feature; and concatenating the at least one historical question sub feature, the at least one historical response sub feature and the current question sub feature respectively with the text feature to generate the at least one historical question feature, the at least one historical response feature and the current question feature.

2. The machine reading comprehension method of claim 1, further comprising:

adjusting a length of the at least one historical question feature, the at least one historical response feature and the current question feature respectively.

3. The machine reading comprehension method of claim 1, further comprising:

generating a concatenated feature after the at least one historical dialogue feature and the current question feature concatenated; and performing the MRC analysis after adjusting a length of the concatenated feature.

4. The machine reading comprehension method of claim 1, wherein performing the RASA analysis on the at least one historical question data, the at least one historical response data and the current question data respectively to obtain the at least one historical question sub feature, the at least one historical response sub feature and the current question sub feature comprises:

disassembling the at least one historical question data, the at least one historical response data and the current question data respectively into a plurality of sub historical question data, a plurality of sub historical response data and a plurality of sub current question data;

generating at least one historical question vector, at least one historical response vector and a current question vector according to the at least one historical question data, the at least one historical response data and the current question data respectively;

generating a plurality of sub historical question vectors, a plurality of sub historical response vectors and a plurality of sub current question vectors according to the plurality of sub historical question data, the plurality of sub historical response data and the plurality of sub current question data respectively; and generating the at least one historical question sub feature, the at least one historical response sub feature and the current question sub feature according to the at least one historical question vector, the at least one historical response vector, the current question vector, the plurality of sub historical question vectors, the plurality of sub historical response vectors and the plurality of sub current question vectors.

5. The machine reading comprehension method of claim 4, wherein generating the at least one historical question vector, the at least one historical response vector and the current question vector according to the at least one historical question data, the at least one historical response data and the current question data respectively comprises:

performing a deep BERT process to generate a plurality of first outcomes;

performing a RBSA process to generate a plurality of second outcomes after performing the deep BERT process; and generating the at least one historical question vector, the at least one historical response vector and the current question vector according to the plurality of first outcomes and the plurality of second outcomes.

6. The machine reading comprehension method of claim 4, wherein generating the at least one historical question sub feature, the at least one historical response sub feature and the current question sub feature according to the at least one historical question vector, the at least one historical response vector, the current question vector, the plurality of sub historical question vectors, the plurality of sub historical response vectors and the plurality of sub current question vectors comprises:

concatenating the at least one historical question vector after adding the plurality of sub historical question vectors to generate the at least one historical question sub feature;

concatenating the at least one historical response vector after adding the plurality of sub historical response vectors to generate the at least one historical response sub feature; and concatenating the current question vector after adding the plurality of sub current question vectors to generate the current question sub feature.

7. The machine reading comprehension method of claim 6, wherein generating the at least one historical question sub feature, the at least one historical response sub feature and the current question sub feature according to the at least one historical question vector, the at least one historical response vector, the current question vector, the plurality of sub historical question vectors, the plurality of sub historical response vectors and the plurality of sub current question vectors further comprises:

adjusting a length of the at least one historical question sub feature, the at least one historical response sub feature and the current question sub feature respectively.

8. The machine reading comprehension method of claim 4, wherein disassembling the at least one historical question data, the at least one historical response data and the current question data respectively into the plurality of sub historical question data, the plurality of sub historical response data and the plurality of sub current question data comprises:

disassembling the at least one historical question data, the at least one historical response data and the current question data respectively into a plurality of phrases;

analyzing a plurality of part-of-speeches of the plurality of phrases; and composing the plurality of sub historical question data, the plurality of sub historical response data and the plurality of sub current question data according to the plurality of phrases and the plurality of part-of-speeches.

9. The machine reading comprehension method of claim 8, further comprising:
  generating a plurality of relation masks according to the plurality of phrases, wherein the plurality of relation masks comprises a plurality of relation points, wherein the plurality of relation points are configured to mark a plurality of master-slave relationships between the plurality of phrases.

10. The machine reading comprehension method of claim 4, wherein generating the at least one historical question vector, the at least one historical response vector and the current question vector according to the at least one historical question data, the at least one historical response data and the current question data respectively comprises:
  performing a RBSA process on the at least one historical question data according to an relation mask corresponding to the at least one historical question data, to generate the at least one historical question vector;
  performing the RBSA process on the at least one historical response data according to an relation mask corresponding to the at least one historical response data, to generate the at least one historical response vector; and
  performing the RBSA process on the current question data according to an relation mask corresponding to the current question data, to generate the current question vector.

11. The machine reading comprehension method of claim 10, wherein generating the at least one historical question vector, the at least one historical response vector and the current question vector according to the at least one historical question data, the at least one historical response data and the current question data respectively comprises:
  performing a deep BERT process before performing the RBSA process.

12. The machine reading comprehension method of claim 4, wherein generating the plurality of sub historical question vectors, the plurality of sub historical response vectors and the plurality of sub current question vectors according to the plurality of sub historical question data, the plurality of sub historical response data and the plurality of sub current question data respectively comprises:
  performing a plurality of RBSA processes on the plurality of sub historical question data according to a plurality of relation masks corresponding to the plurality of sub historical question data, to generate the plurality of sub historical question vectors;
  performing the plurality of RBSA processes on the plurality of sub historical response data according to a plurality of relation masks corresponding to the plurality of sub historical response data, to generate the plurality of sub historical response vectors; and
  performing the plurality of RBSA processes on the plurality of sub current question data according to a plurality of relation masks corresponding to the plurality of sub current question data, to generate the plurality of sub current question vectors.

13. The machine reading comprehension method of claim 12, wherein each of the plurality of RBSA processes comprises:
  performing a self attention analysis; and
  performing a deep neural network.

14. A machine reading comprehension device, comprising:
  a memory, configured to store at least one historical dialogue data; and
  a processor, coupled to the memory, configured to perform a RASA feature extraction process on the at least one historical dialogue data and a current question data respectively to obtain at least one historical dialogue feature and a current question feature, and configured to perform a MRC analysis according to the at least one historical dialogue feature and the current question feature to obtain a response output;
  wherein the at least one historical dialogue data comprises at least one historical question data and at least one historical response data, and the at least one historical dialogue feature comprises at least one historical question feature and at least one historical response feature; and
  wherein the processor is further configured to:
  perform a RASA analysis on the at least one historical question data, the at least one historical response data and the current question data respectively to obtain at least one historical question sub feature, at least one historical response sub feature and a current question sub feature;
  perform the RASA analysis on a text data to obtain a text feature; and
  concatenate the at least one historical question sub feature, the at least one historical response sub feature and the current question sub feature respectively with the text feature to generate the at least one historical question feature, the at least one historical response feature and the current question feature.

15. The machine reading comprehension device of claim 14, wherein the processor is further configured to perform the RASA feature extraction process according to a plurality of relation masks, wherein each of the plurality of relation masks corresponds to one of the at least one historical question data, the at least one historical response data and the current question data, and wherein each of the plurality of relation masks is generated according to a plurality of phrases comprised in the one of the at least one historical question data, the at least one historical response data and the current question data.

16. A non-transient computer readable medium, comprising at least one program command configured to operate a machine reading comprehension method, wherein the machine reading comprehension method comprises following operations:
  performing, by a processor, a RASA feature extraction process on at least one historical dialogue data and a current question data respectively to obtain at least one historical dialogue feature and a current question feature; and
  performing, by the processor, a MRC analysis according to the at least one historical dialogue feature and the current question feature to obtain a response output;
  wherein the at least one historical dialogue data comprises at least one historical question data and at least one historical response data, and the at least one historical dialogue feature comprises at least one historical question feature and at least one historical response feature; and
  wherein the machine reading comprehension method further comprises following operations:
  performing, by the processor, a RASA analysis on the at least one historical question data, the at least one historical response data and the current question data respectively to obtain at least one historical question sub feature, at least one historical response sub feature and a current question sub feature;
  performing, by the processor, the RASA analysis on a text data to obtain a text feature; and concatenating, by the processor, the at least one historical question sub feature, the at least one historical response sub feature and the current question sub feature respectively with the text feature to generate the at least one historical question feature, the at least one historical response feature and the current question feature.

17. The non-transient computer readable medium of claim 16, wherein the machine reading comprehension method comprises following operations:
performing the RASA feature extraction process according to a plurality of relation masks, wherein each of the plurality of relation masks corresponds to one of the at least one historical dialogue data and the current question data, and the plurality of relation masks are generated respectively according to a plurality of phrases comprised in the one of the at least one historical dialogue data and the current question data.

* * * * *